(12) United States Patent
Jung et al.

(10) Patent No.: US 11,399,086 B2
(45) Date of Patent: Jul. 26, 2022

(54) ELECTRONIC DEVICE HAVING EXPANDABLE INTERNAL SPACE

(71) Applicant: Samsung Electronics Co., Ltd., Gyeonggi-do (KR)

(72) Inventors: Iksu Jung, Gyeonggi-do (KR); Seonghoon Kim, Gyeonggi-do (KR); Minsung Lee, Gyeonggi-do (KR); Minwoo Yoo, Gyeonggi-do (KR); Jongchul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 16/815,115

(22) Filed: Mar. 11, 2020

(65) Prior Publication Data

US 2020/0329132 A1 Oct. 15, 2020

(30) Foreign Application Priority Data

Apr. 9, 2019 (KR) .................. 10-2019-0041257

(51) Int. Cl.
| | |
|---|---|
| *H04M 1/03* | (2006.01) |
| *H04M 1/02* | (2006.01) |
| *H04R 1/02* | (2006.01) |
| *H04R 1/28* | (2006.01) |

(52) U.S. Cl.
CPC ......... *H04M 1/035* (2013.01); *H04M 1/0216* (2013.01); *H04M 1/0266* (2013.01); *H04R 1/02* (2013.01); *H04R 1/2811* (2013.01); *H04R 2499/11* (2013.01)

(58) Field of Classification Search
CPC .. H04M 1/0216; H04M 1/0266; H04M 1/035; H04R 1/02; H04R 1/025; H04R 1/2811; H04R 2201/025; H04R 2499/11
USPC ..... 455/575.3; 381/332, 334, 337, 365, 386; 361/679.3, 679.01
See application file for complete search history.

(56) References Cited

U.S. PATENT DOCUMENTS 5,883,966 A * 3/1999 Kubo .................. H04M 1/0214
381/386
10,142,717 B2 11/2018 Behles et al.
(Continued)

FOREIGN PATENT DOCUMENTS

| JP | 2834012 B2 | 10/1998 |
|---|---|---|
| KR | 10-0584349 B1 | 5/2006 |

(Continued)

OTHER PUBLICATIONS

International Search Report dated Jun. 12, 2020.

*Primary Examiner* — Tan H Trinh
(74) *Attorney, Agent, or Firm* — Cha & Reiter, LLC

(57) ABSTRACT

An electronic device is disclosed, including: a housing that is foldable, the housing including a front plate facing a first direction, a rear plate facing a second direction opposite the first direction, and a side member surrounding a space defined between the front plate and the rear plate, a display having one surface visible through the front plate, and foldable with the front plate, a speaker disposed between the front plate and the rear plate, the speaker movable with a folding of the front plate, and a resonance space defined between the speaker and the rear plate, a size of the resonance space changeable according to the folding of the front plate.

16 Claims, 16 Drawing Sheets

(56) References Cited

U.S. PATENT DOCUMENTS

| | | | | |
|---|---|---|---|---|
| 2004/0224731 | A1* | 11/2004 | Ahn | H04R 5/02 455/575.3 |
| 2009/0170571 | A1* | 7/2009 | Alameh | H04M 1/0216 455/575.3 |
| 2009/0245565 | A1* | 10/2009 | Mittleman | H04R 1/025 381/365 |
| 2010/0232100 | A1* | 9/2010 | Fukuma | H04M 1/0216 361/679.01 |
| 2010/0238119 | A1* | 9/2010 | Dubrovsky | G06F 3/04886 345/169 |
| 2011/0076883 | A1* | 3/2011 | Jol | H01R 43/24 439/521 |
| 2011/0280430 | A1* | 11/2011 | Kim | H04R 1/02 381/337 |
| 2012/0121117 | A1* | 5/2012 | Kim | H04M 1/03 381/334 |
| 2013/0148833 | A1* | 6/2013 | Endo | H04R 1/028 381/332 |
| 2014/0210675 | A1* | 7/2014 | Hwang | H01Q 13/10 343/702 |
| 2016/0147263 | A1* | 5/2016 | Choi | G06F 1/1652 361/679.3 |
| 2016/0202224 | A1* | 7/2016 | Lloyd | G05D 7/01 73/865.8 |
| 2017/0099742 | A1* | 4/2017 | Choi | H05K 5/03 |
| 2017/0117611 | A1* | 4/2017 | Lepe | H01Q 1/2266 |
| 2017/0125916 | A1* | 5/2017 | Camacho | H01Q 1/38 |
| 2018/0109658 | A1* | 4/2018 | Le | H04M 1/03 |
| 2018/0270971 | A1 | 9/2018 | Moon et al. | |
| 2018/0288201 | A1* | 10/2018 | Lee | H04M 1/026 |
| 2018/0314295 | A1 | 11/2018 | D'Penha et al. | |
| 2019/0165472 | A1* | 5/2019 | Yun | H04B 1/40 |
| 2019/0369668 | A1* | 12/2019 | Kim | G06F 1/1681 |
| 2021/0067877 | A1* | 3/2021 | Jeon | H04R 5/02 |
| 2021/0263564 | A1* | 8/2021 | Chen | H04N 21/4424 |

FOREIGN PATENT DOCUMENTS

| | | |
|---|---|---|
| KR | 10-0794115 B1 | 1/2008 |
| KR | 10-2009-0102544 A | 9/2009 |
| KR | 10-2010-0062078 A | 6/2010 |
| KR | 10-1114013 B1 | 2/2012 |
| KR | 10-2016-0041295 A | 4/2016 |

* cited by examiner

ELECTRONIC DEVICE HAVING EXPANDABLE INTERNAL SPACE

CROSS-REFERENCE TO RELATED APPLICATION

This application is based on and claims priority under 35 U.S.C. § 119 to Korean Patent Application No. 10-2019-0041257 filed on Apr. 9, 2019, in the Korean Intellectual Property Office, the disclosure of which is incorporated by reference herein in its entirety.

BACKGROUND

Technical Field

Certain embodiments of the disclosure relate to an electronic device having an expandable internal space.

Description of Related Art

Electronic devices have multiple functions, serving as more than communication devices for transmitting and receiving voice calls, but also functioning as portable multimedia players for listening to music and watching movies. Thanks to hardware advances and continued research, the performance of electronic devices has improved to the point of functioning as professional multimedia reproduction devices, including the ability to provide rich and clear audio output to users.

SUMMARY

As electronic devices become slimmer, available space within the housing has been reduced. This may render it difficult to secure sufficient space to enable speaker resonance for audio output, limiting the improvement of audio fidelity during playback. The present disclosure provides a structure that can enlarge an available resonance space for reproduction of rich sound, despite the limited internal space of the electronic device.

Multiple components of the device generate heat during operation, and proper heat dissipation must be achieved to ensure operational reliability of the electronic device. Accordingly, the disclosure provides a structure than can enlarge the available heat dissipation space within the limited internal space of the electronic device.

According to an embodiment of the disclosure, there is provided an electronic device. The electronic device may include a housing that is foldable, the housing including a front plate facing a first direction, a rear plate facing a second direction opposite the first direction, and a side member surrounding a space defined between the front plate and the rear plate, a display having one surface visible through the front plate, and foldable with the front plate, a speaker disposed between the front plate and the rear plate, the speaker movable with a folding of the front plate, and a resonance space defined between the speaker and the rear plate, a size of the resonance space changeable according to the folding of the front plate.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
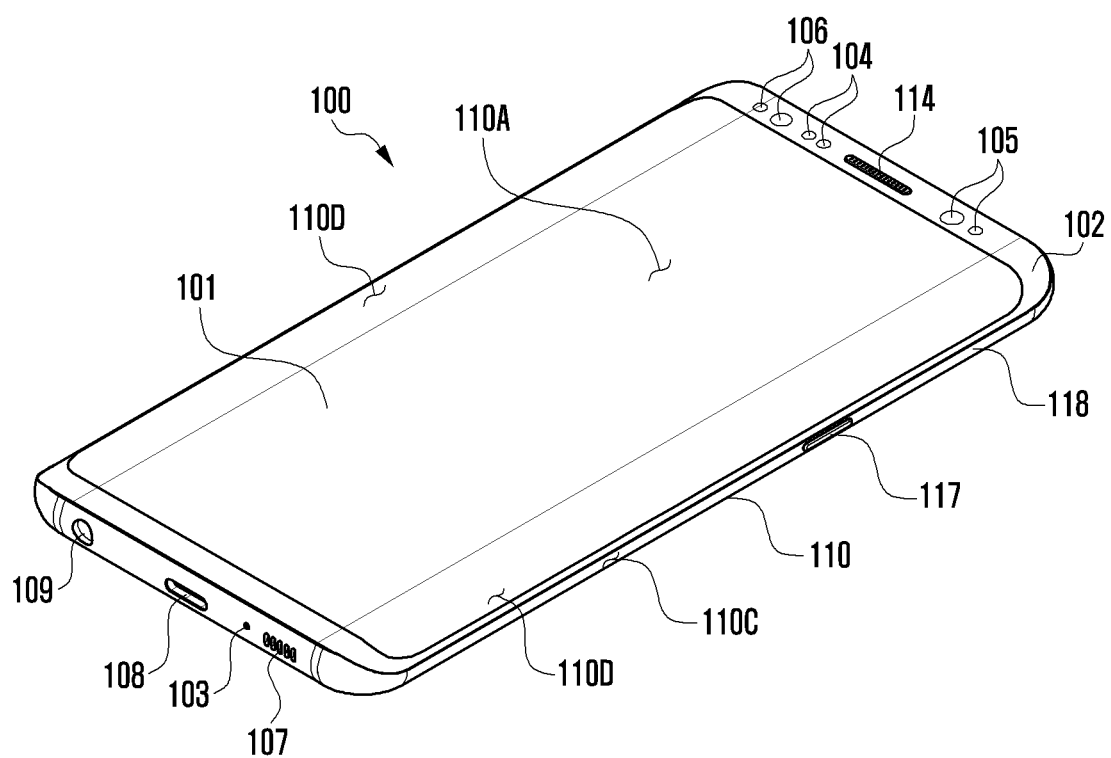
FIG. 1 is a perspective view of the front of a mobile electronic device according to an embodiment.
Figure 2:
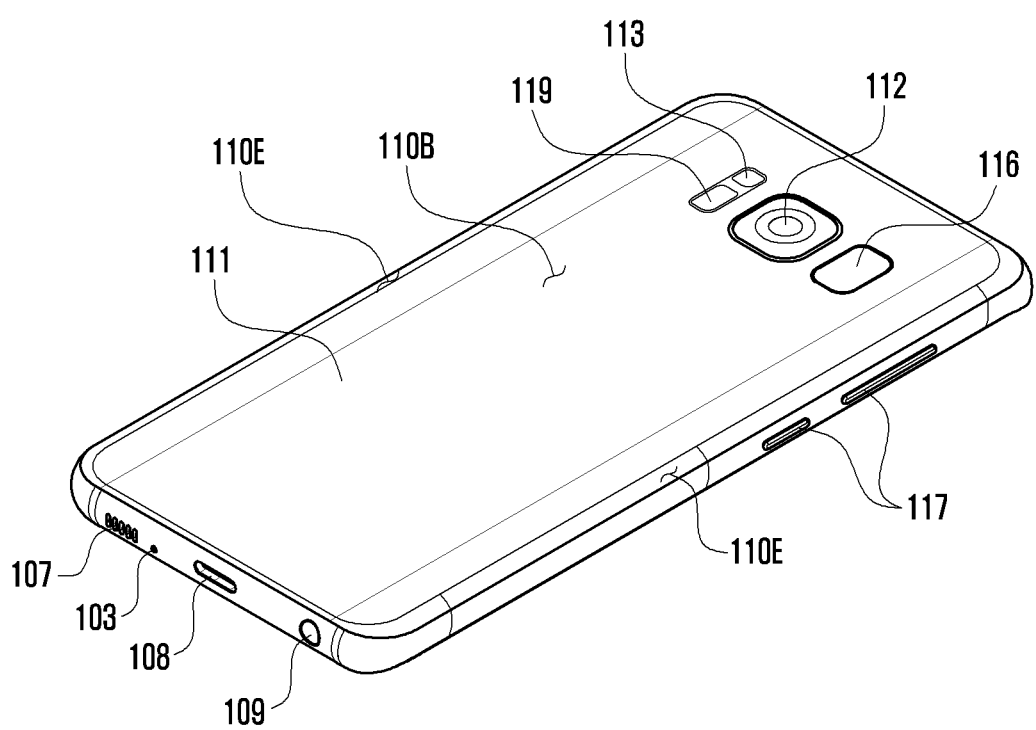
FIG. 2 is a perspective view of the rear of the electronic device of FIG. 1.

FIG. 1 illustrates a perspective view showing a front surface of a mobile electronic device 100 according to an embodiment, and FIG. 2 illustrates a perspective view showing a rear surface of the mobile electronic device 100 shown in FIG. 1.

Referring to FIGS. 1 and 2, the mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104, 116 and 119, camera modules 105, 112 and 113, a key input device 117, a light emitting device 106, and connector holes 108 and 109. The mobile electronic device 100 may omit at least one (e.g., the key input device 117 or the light emitting device 106) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device 106. At least one of the audio module 114, the sensor module 104, the camera module 105, the fingerprint sensor 116 (e.g., the fourth sensor module 116), and the light emitting element 106 may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole and speaker holes, respectively. The microphone hole may contain a microphone disposed therein for acquiring external sounds and, in a case, contain a plurality of microphones to sense a sound direction. The speaker holes may be classified into an external speaker hole and a call receiver hole. The microphone hole and the speaker holes may be implemented as a single hole, or a speaker (e.g., a piezo speaker) may be provided without the speaker holes.

The sensor modules 104, 116 and 119 may generate electrical signals or data corresponding to an internal operating state of the mobile electronic device 100 or to an external environmental condition. The sensor modules 104, 116 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module 116 (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module 116 disposed on the second surface 110B of the housing 110.

The light emitting device 106 may be disposed on the first surface 110A of the housing 110. For example, the light emitting device 106 may provide status information of the electronic device 100 in an optical form. The light emitting device 106 may provide a light source associated with the operation of the camera module 105. The light emitting device 106 may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Figure 3:
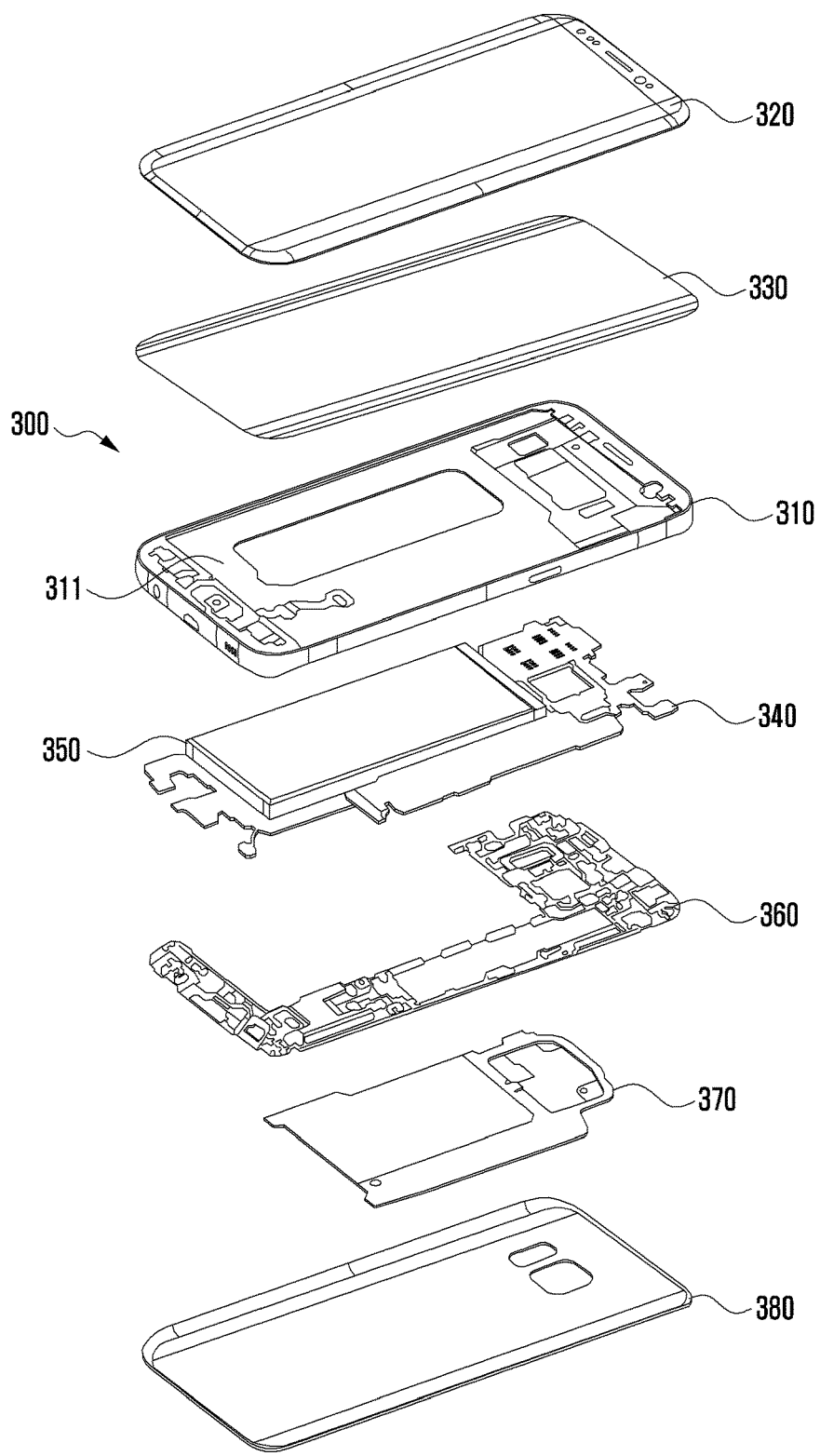
FIG. 3 is an exploded perspective view of the electronic device of FIG. 1.

FIG. 3 illustrates an exploded perspective view showing a mobile electronic device 300 shown in FIG. 1.

Referring to FIG. 3, the mobile electronic device 300 may include a lateral bezel structure 310, a first support member 311 (e.g., a bracket), a front plate 320, a display 330, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power utilized for charging wirelessly. An antenna structure may be formed by a part or combination of the lateral bezel structure 310 and/or the first support member 311.

Figure 4:
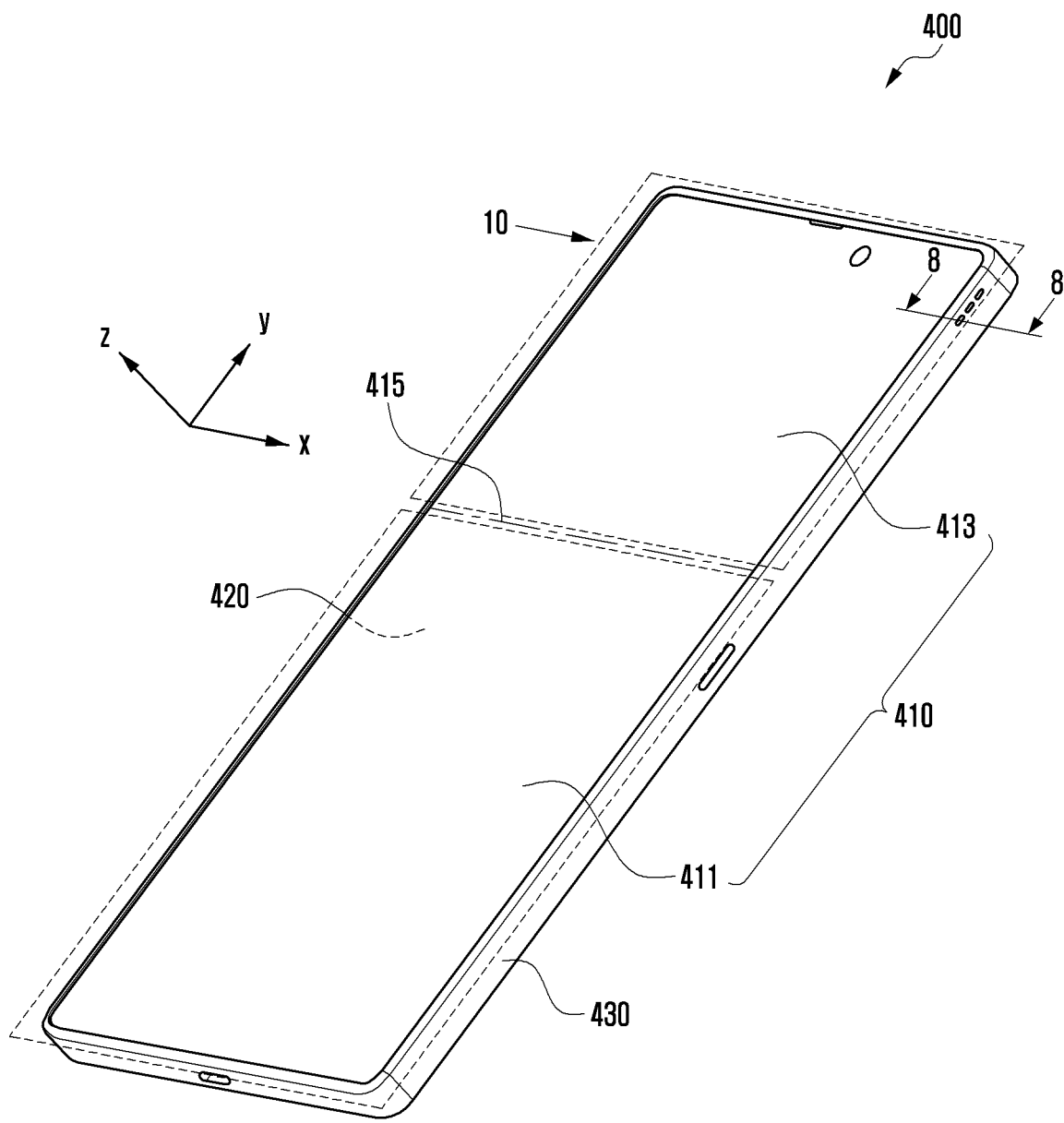
FIG. 4 is a perspective view of an electronic device before the variable resonance space is expanded according to an embodiment of the disclosure.
Figure 5:
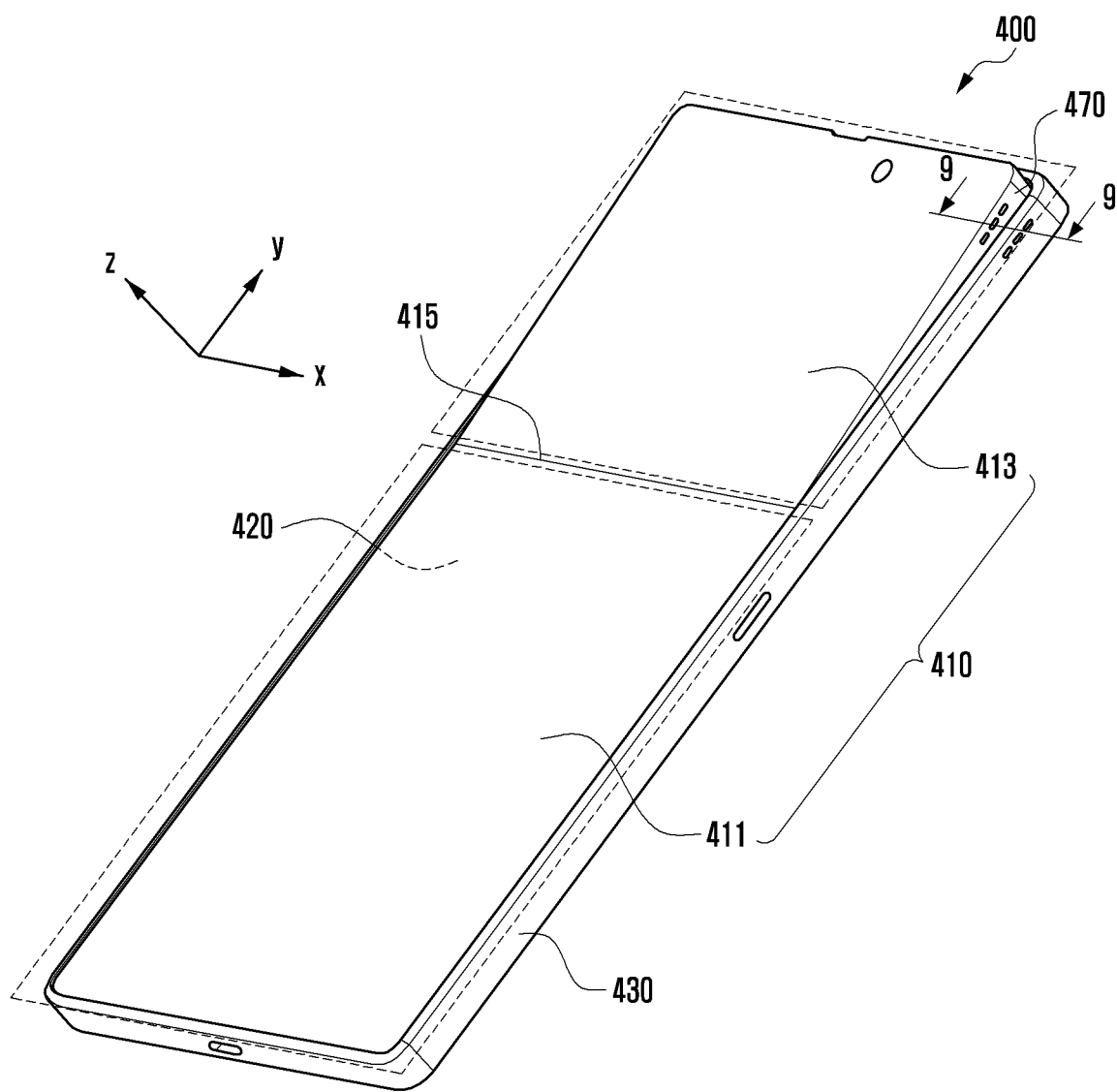
FIG. 5 is a perspective view of an electronic device whose variable resonance space is expanded according to an embodiment of the disclosure.

FIG. 4 is a perspective view of the electronic device 400 in a state before the variable resonance space (e.g., variable resonance space 460 in FIG. 8) is expanded, according to an embodiment of the disclosure. FIG. 5 is a perspective view of the electronic device 400 in a state after the variable resonance space 460 is expanded according to an embodiment of the disclosure.

With reference to FIGS. 4 and 5, the electronic device 400 according to an embodiment of the disclosure, may be formed such that at least a portion of the front plate 410 (e.g., front plate 320 in FIG. 3) is foldable at a preset angle. The front plate 410 may be folded about a designated axis 415 spanning two opposite edges (e.g., spanning the width of the electronic device). For example, in FIGS. 4 and 5, the front plate 410 may be folded with respect to the axis 415 spanning the electronic device 400 from side to side (e.g., in the width direction of the electronic device).

In an embodiment, the front plate 410 of the electronic device 400 may include a first region 411 and a second region 413. The first region 411 and second region 413 may be separated from one another by the axis 14. The first region 411 may be disposed below the axis 415 about which the front plate 410 is folded. For example, in FIGS. 4 and 5, the first region 411 may be located at one side (e.g., below side) of the axis 415. The second region 413 may be located above the axis 415 about which the front plate 410 is folded. For example, in FIGS. 4 and 5, the second region 413 may be located at the other side (e.g., above) of the axis 415. The first region 411 may be a fixed region that does not move when the second region 413 of the front plate 410 is folded. The second region 413 may be at least partially lifted outward from the side member 430 when the front plate 410 is folded. When the second region 413 of the front plate 410 is lifted, the inner housing 470 may be lifted as well. For example, as shown in FIG. 5, the first region 411 may be fixed, and the second region 413 may be separated from the side member 430 as to protrude forward (e.g., in the z-axis direction). As the second region 413 protrudes forward, the internal space between the rear plate 420 and the front plate 410 expands. This may result in the creation of additional resonance space 460 for sound equipment, such as a speaker (e.g., speaker 450 in FIG. 6).

Figure 6:
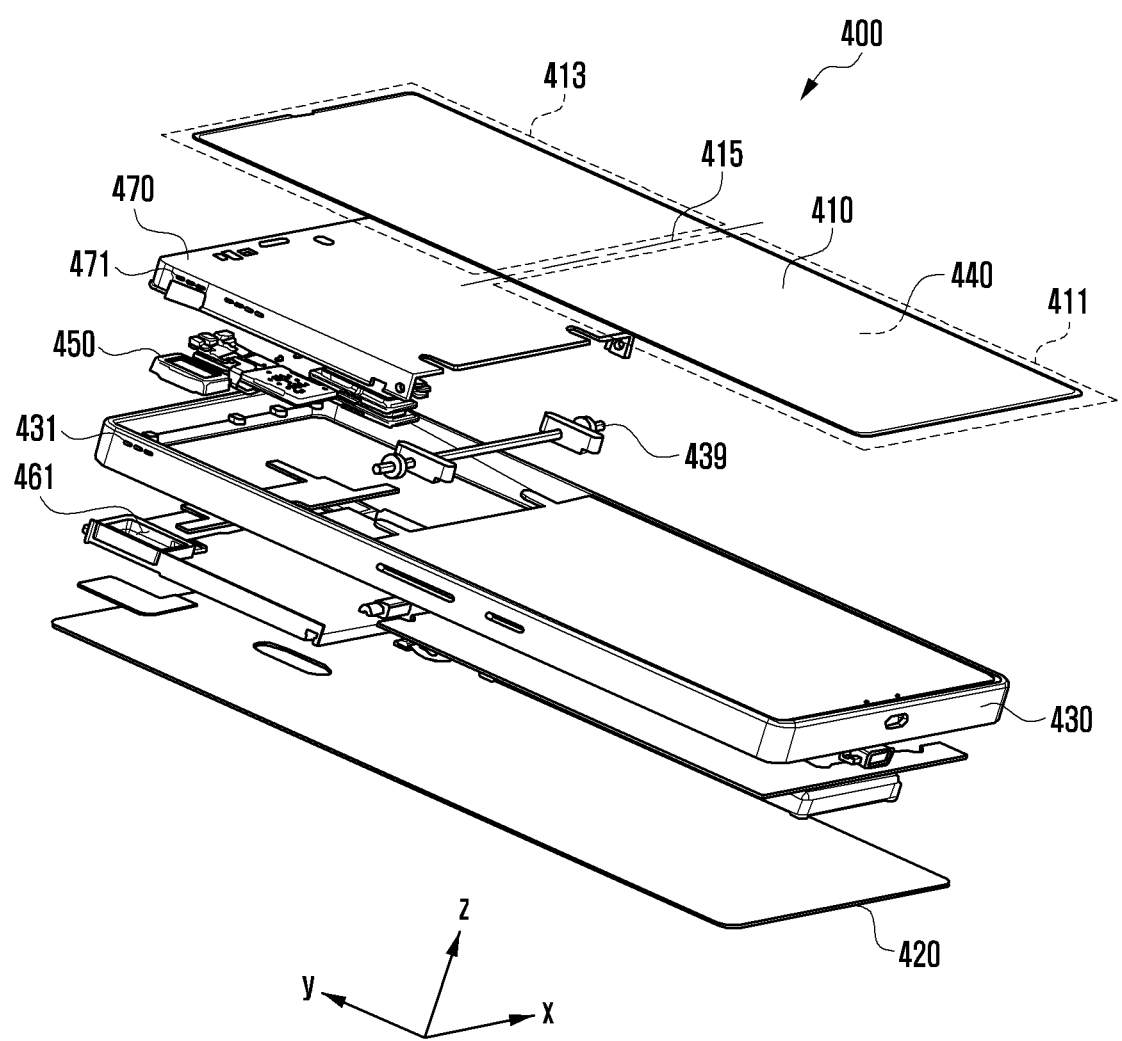
FIG. 6 is an exploded perspective view of an electronic device according to an embodiment of the disclosure.

FIG. 6 is an exploded perspective view of the electronic device 400 according to an embodiment of the disclosure.

In an embodiment, the electronic device 400 having a variable resonance space (e.g., variable resonance space 460 in FIG. 8) may include a front plate 410, a rear plate 420, a side member 430, a display 440, a speaker 450, and an inner housing 470 for the variable resonance space 460.

In the description of the electronic device 400 according to an embodiment of the disclosure, a first direction may mean the upward direction (e.g., z-axis direction) and a second direction may mean the downward direction (e.g., negative z-axis direction) with reference to the illustration in FIG. 6.

In an embodiment, the front plate 410 may be disposed toward the first direction (z-axis direction), and may refer to a window including the display 440 that is at least partially exposed (e.g., and/or visible) to the exterior of the electronic device 400 and provides a direct contact surface for the user to execute screen manipulation and receive input operations. The front plate 410 may be made of a material that is elastically deformable to be folded or unfolded. The front plate 410 may be made of, for example, a polyimide (PI) material based on a plastic polymer.

In an embodiment, the display 440 may be a flexible display, and may be coupled to the front plate 410 so as to be foldable based on the folding of the front plate 410. The display 440 may be visible through at least a portion of the front plate 410.

In an embodiment, the inner housing 470 may be formed as to correspond to the second region 413 of the front plate 410, and may be moved along with the lifting of the second region 413 via a hinge module 439, as caused by the folding of the front plate 410. The inner housing 470 may be automatically moved along with the lifting of the second region 413 based on a received event (e.g., sound reproduction mode) of the electronic device 400. In an embodiment, the inner housing 470 may be manually moved with the lifting of the second region 413 by manipulating of an user of the electronic device 400. The inner housing 470 may provide a space in which at least one electronic component disposed inside the electronic device 400 may be coupled. At least one electronic component may be arranged to be moved along with the lifting of the second region 413. For example, the at least one electronic component may include the speaker 450 that is disposed in the inner housing 470 and lifted together with the second region 413.

In an embodiment, the rear plate 420 may be disposed in the second direction (negative z-axis direction) opposite to the first direction and may be disposed substantially in parallel with the front plate 410. In the description on the electronic device 400, what is described as being coupled to or fixed to the rear plate 420 may include not only direct coupling with the rear plate 420 but also indirect coupling with and fixing to the rear plate 420 via another component in the middle.

In an embodiment, the side member 430 may be formed to surround the space between the front plate 410 and the rear plate 420. The side member 430 may be formed integrally with or separately from the rear plate 420. The side member 430, the front plate 410, and the rear plate 420 may together implement a housing that forms the overall exterior of the electronic device 400. The side member 430 may be not deformed while the second region 413 of the front plate 410 is being folded.

In an embodiment, the speaker 450 may be disposed in the inner housing 470 and be lifted together with the second region 413 of the front plate 410. The speaker 450 may be disposed close to the side member 430 in the internal space of the electronic device 400. Plural speakers 450 may be disposed.

In an embodiment, the variable resonance space (e.g., variable resonance space 460 in FIG. 8) may be located between the speaker 450 and the rear plate 420, and the size thereof may change according to the folding of the second region 413 of the front plate 410. The variable resonance space 460 can be formed by combining a first resonance housing 461 positioned on the rear plate side with a second resonance housing (e.g., second resonance housing 463 in FIG. 8) formed on the inner housing 470.

Figure 7:
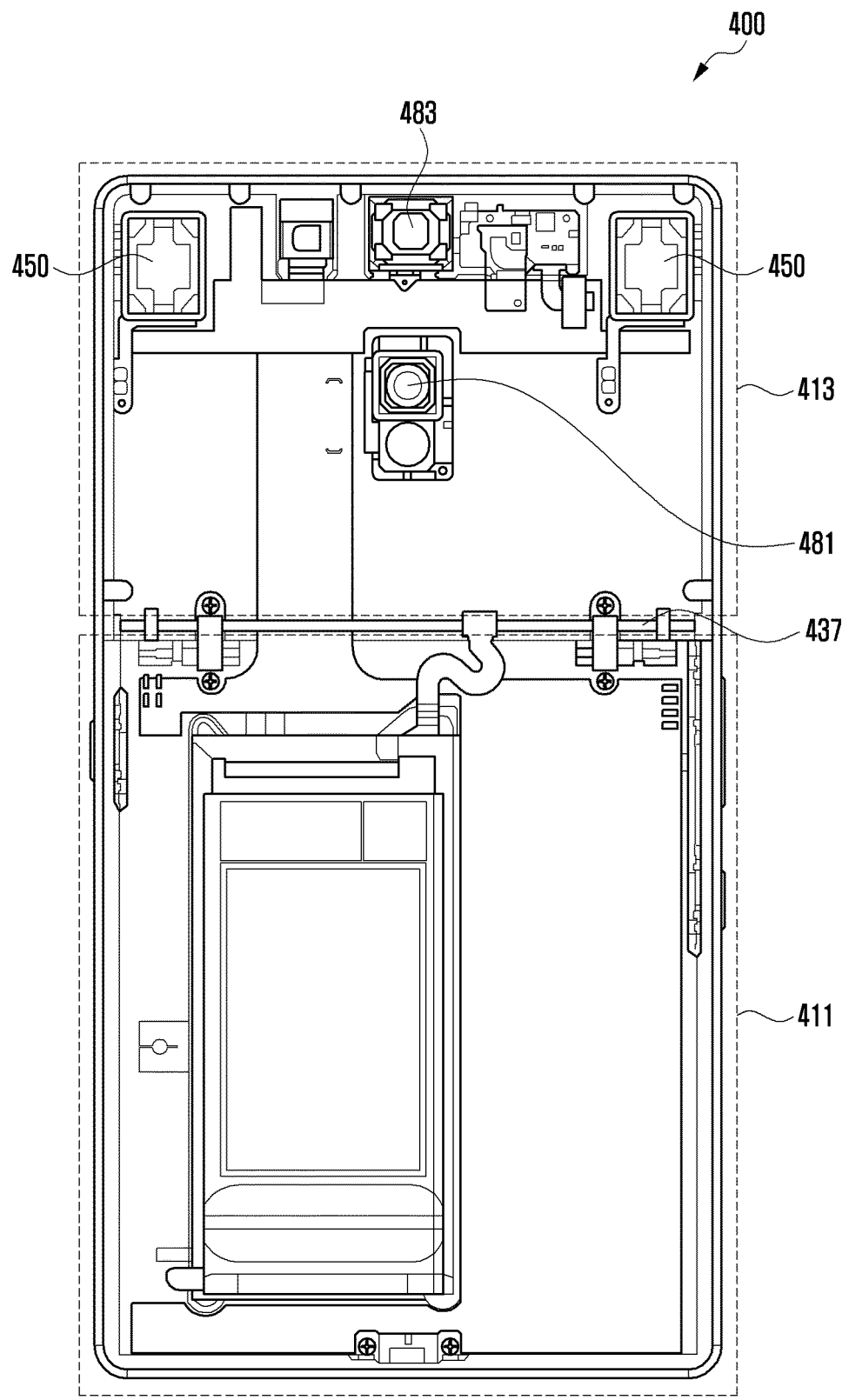
FIG. 7 is a view of an electronic device whose front plate is removed according to an embodiment of the disclosure.

FIG. 7 is a view of the electronic device 400 whose front plate 410 is removed according to an embodiment of the disclosure.

In an embodiment, the axis (e.g., axis 415 in FIG. 4) about which the front plate 410 is foldable may be implemented using, for example, an axial shaft 437 spanning a width of the electronic device 400 from side to side, as shown in FIG. 7. The shaft 437 may provide a center of rotation for the inner housing 470. When the inner housing 470 rotates about the shaft 437, the front plate 410 may thus be folded. FIG. 7 illustrates a rod-shaped shaft that traverses the electronic device 400 widthwise from side to side. However, without being limited thereto, any type of structure capable of rotating the inner housing 470 to a certain range about the axis may be used.

In an embodiment, the first region 411 may indicate a region that is not moved (e.g., reconfigured) in a fixed state, when the front plate 410 is folded, and the second region 413 may indicate a region that is lifted apart from the side member 430 when the front plate 410 is folded. That is, a portion of the device actually emerges/protrudes from the front plate 410 during the folding action. In the description of the electronic device 400, the first region 411 which remains in the fixed state may be referred to as a lower portion, and the second region 413 which is movable and thus, reconfigurable is referred to as an upper portion. However, without being limited thereto, the direction may be referred to differently by changing up and down or left and right. Here, the speaker 450 and the resonance space (e.g., variable resonance space 460 in FIG. 8) may be disposed as to correspond with the movable region.

In an embodiment, a plurality of speakers 450 may be mounted on the electronic device 400. The speakers 450 may be disposed proximate to the side member 430 of the electronic device 400, to improve the radiation efficiency of sound. Alternatively, the plurality of speakers 450 may be disposed at various locations corresponding to the second region 413, distal from the side member 430, in the internal space of the electronic device 400.

In an embodiment, the electronic device 400 may be equipped with various electronic components in addition to the speaker 450. For example, a receiver, a proximity sensor, an illuminance sensor, a front camera module 483, and a rear camera module 481 may be mounted. Among these electronic components, components that need to be exposed mainly through the front plate 410 may be disposed in the inner housing 470 and may be moved along with the folding of the front plate 410. This may be applied to, for example, the receiver, the proximity sensor, the illuminance sensor, or the front camera module. The rear camera module 481 that does not need to be exposed through the front plate 410 may be fixed to the rear plate 420 and may be not moved.

Figure 8:
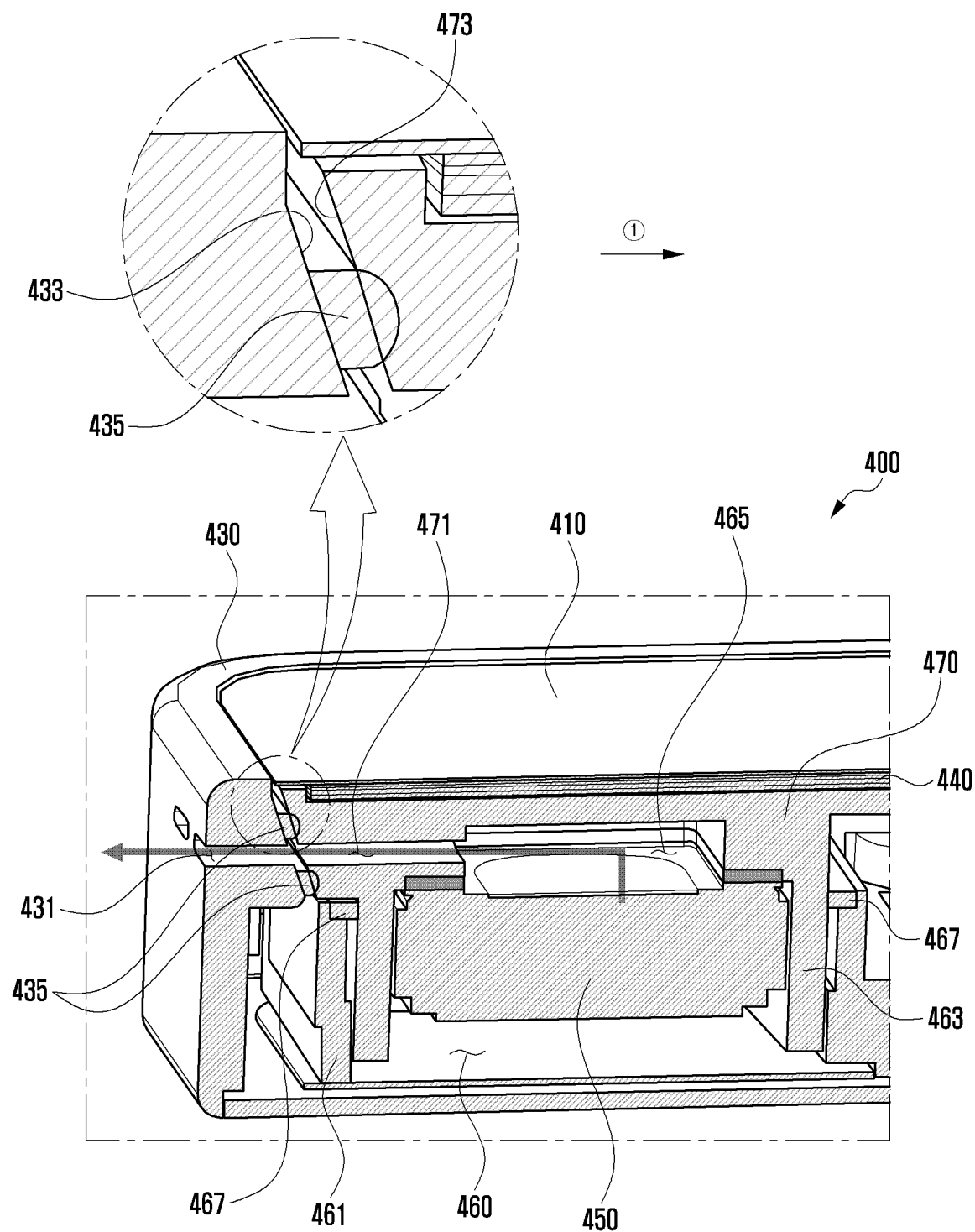
FIG. 8 is a cross-sectional view taken along the line 8-8 of FIG. 4.
Figure 9:
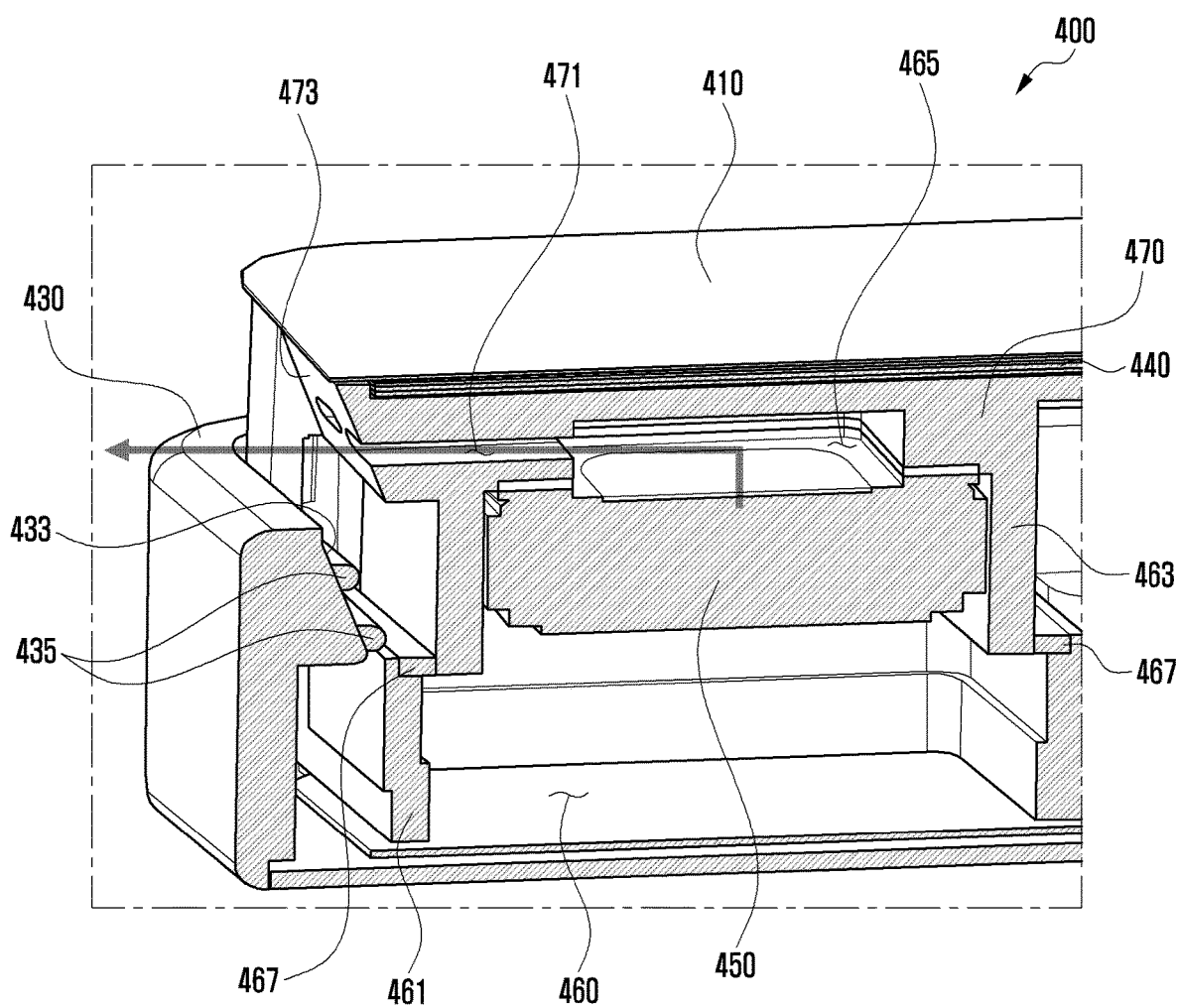
FIG. 9 is a cross-sectional view taken along the line 9-9 of FIG. 5.

FIG. 8 is a cross-sectional view taken along the line 8-8 of FIG. 4, and FIG. 9 is a cross-sectional view taken along the line 9-9 of FIG. 5. In other words, FIG. 8 shows a state before the variable resonance space 460 is expanded, and FIG. 9 shows a state after the variable resonance space 460 is expanded.

In an embodiment, the variable resonance space 460 may be formed by combining a first resonance housing 461 and a second resonance housing 463. With reference to FIG. 8, the first resonance housing 461 may be disposed at the rear plate side, and the second resonance housing 463 may be formed at the inner housing 470. The speaker 450 may be seated in the second resonance housing 463. The variable resonance space 460 may be formed via a coupling, in which the second resonance housing 463 is inserted into the first resonance housing 461, such that the first resonance housing 461 is coupled into the second resonance housing 463. Alternatively, the first resonance housing 461 may be inserted into the second resonance housing 463 to form the variable resonance space 460.

In an embodiment, the electronic device 400 may include a first sealing member 467 to seal the coupling portion between the first resonance housing 461 and the second resonance housing 463. The variable resonance space 460 can be changed by inserting or extracting the second resonance housing 463 into or from the first resonance housing 461. A preset spacing may be provided therebetween to facilitate this insertion or extraction operation. In addition, the second resonance housing 463, when extracted from the first resonance housing 461 because of the folding of the second region 413 of the front plate 410, may not egress vertically from the first resonance housing 461, but will egress in a curved manner due to the rotation about the hinge. Hence, a gap may be defined between the first resonance housing 461 and the second resonance housing 463. The gap between the first resonance housing 461 and the second resonance housing 463 may affect the sound quality of the speaker 450. Accordingly, the first sealing member 467 may be utilized to provide sealing. The first sealing member 467 may be made of an elastic material, and when installed, may effectively seal the gap between the first resonance housing 461 and the second resonance housing 463.

In an embodiment, with reference to FIG. 8, the acoustic path, as configured before the variable resonance space 460 of the electronic device 400 is expanded, may include a first space 465, a first speaker hole 471, and a second speaker hole 431. The first space 465 may be formed by a recessed portion of the bottom of the second resonance housing 463. The first speaker hole 471 may be connected to the first space 465 and penetrate the inner housing 470 toward the side member 430. The second speaker hole 431 may penetrate the side member 430 and be communicatively connected to the first speaker hole 471. The sound generated by the speaker 450 may be transmitted to the first space 465 and delivered to an exterior of the electronic device 400 through the first speaker hole 471 and the second speaker hole 431. Here, as the portion at which the first speaker hole 471 and the second speaker hole 431 are communicatively connected is formed by a contact between the inner housing 470 and the side member 430, a space may result and the sound may leak, affecting the sound quality of the speaker 450. Hence, the electronic device 400 may include a second sealing member 435 to seal the connection portion between the first speaker hole 471 and the second speaker hole 431.

In an embodiment, inclined surfaces 433 and 473 may be formed in at least a portion of the region where the inner housing 470 and the side member 430 contact each other. With reference to FIGS. 8 and 9, the side member 430 may include the inclined surface 433, which protrudes downward gradually along a direction from the outside toward the center (e.g., first direction). The inner housing 470 may include the inclined surface 473, which may correspond to the inclined surface 433 of the side member 430. The inclined surfaces 433 and 473 may be formed in at least a region where the first speaker hole 471 and the second speaker hole 431 are disposed.

In the absence of the inclined surfaces 433 and 473, when the inner housing 470 is moved as the front plate 410 is folded or unfolded, the second sealing member 435 may be damaged by wear resulting from repeated friction between the inner housing 470 and the side member 430, reducing sealing performance. Hence, the inclined surfaces 433 and 473, as formed between the inner housing 470 and the side member 430, may maintain the sealing performance, by preventing the second sealing member 435 from frictional rubbing during the movement of the inner housing 470. In addition, the inclined surfaces 433 and 473 guide the second region 413 of the front plate 410, when the second region 413 is moved with a radius of curvature about the axis (e.g., shaft 437 in FIG. 7).

In an embodiment, with reference to FIG. 9, the acoustic path, after the variable resonance space 460 of the electronic device 400 is expanded, may define a first space 465 and a first speaker 450. The sound generated by the speaker 450 may be transmitted in to the first space 465 and propagated to an exterior of the electronic device 400 through the first speaker hole 471, without passing through the second speaker hole 431. Compared with the case of FIG. 8, the sound quality can be improved by expanding the variable resonance space 460 for the speaker 450 and shortening the transmission path of sound.

Figure 10:
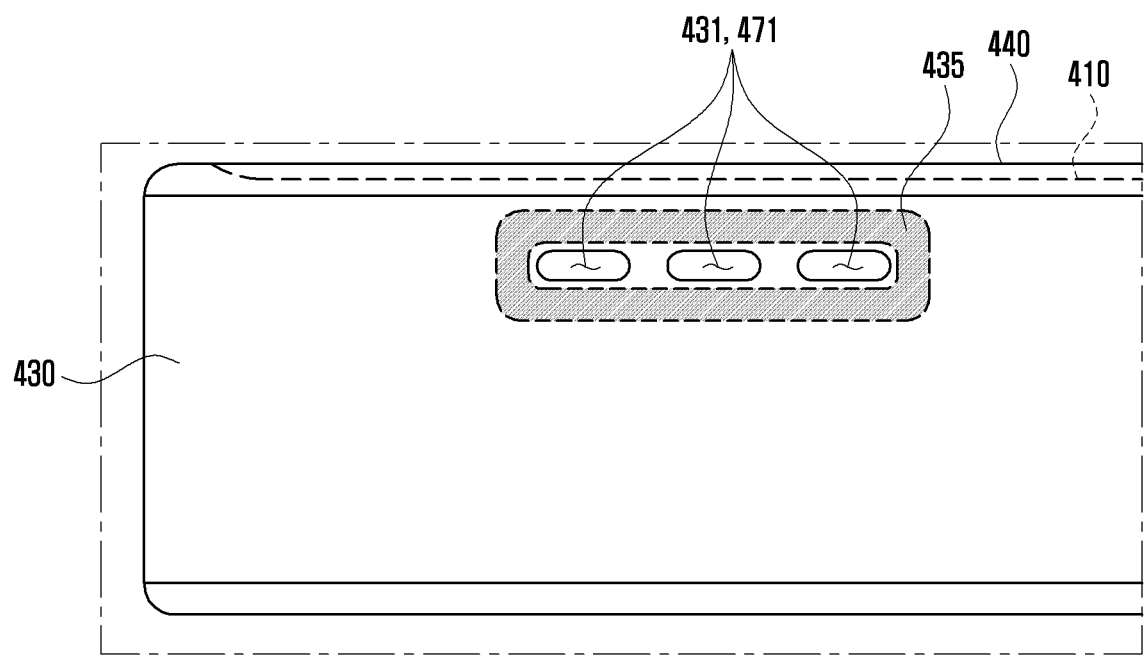
FIG. 10 is a view centering on a first speaker hole and a second sealing member in the electronic device according to an embodiment of the disclosure.

FIG. 10 is a view illustrating the first speaker hole 471 and the second sealing member 435 in the electronic device 400 according to an embodiment of the disclosure. In other words, FIG. 10 is a view of the electronic device 400 seen from the directed corresponding to element 10 indicated FIG. 4.

With reference to FIG. 10, the second sealing member 435 may be formed in the shape of a ring (or closed curve) surrounding the first speaker hole 471 or the second speaker hole 431. The second sealing member 435 formed in a ring-shaped (or closed curve) can seal the first speaker hole 471 and the second speaker hole 431. This can block the leakage of sound from the speaker 450 during transmission, preventing degradation of the sound quality.

Figure 11:
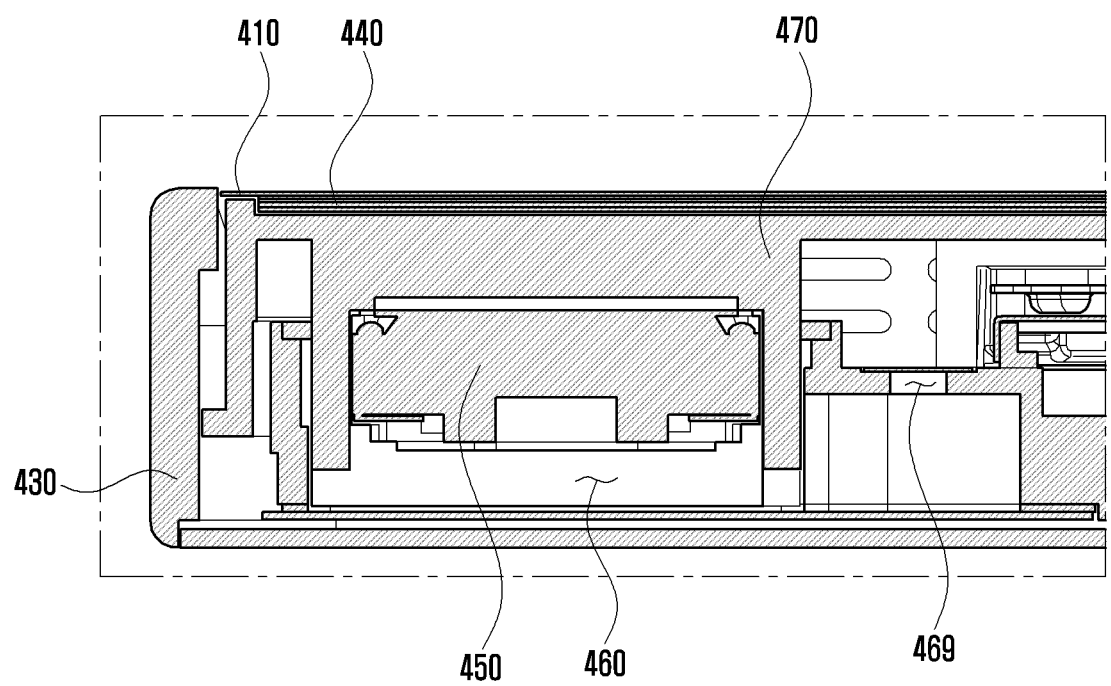
FIG. 11 is a cross-sectional view centering on the air vent hole of the electronic device according to an embodiment of the disclosure.
Figure 12:
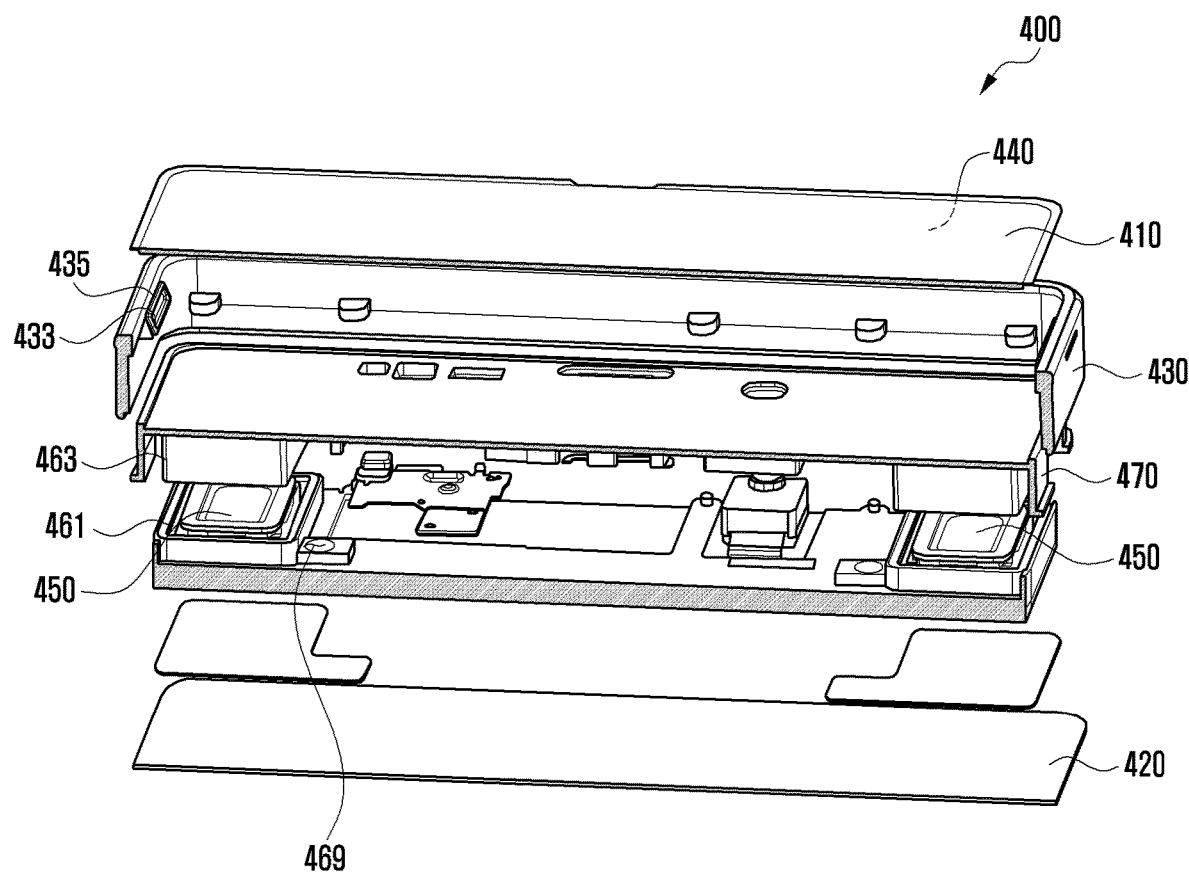
FIG. 12 is an exploded view centering on a portion around the air vent hole of the electronic device according to an embodiment of the disclosure.

FIG. 11 is a cross-sectional view centering on the air vent hole 469 of the electronic device according to an embodiment of the disclosure, and FIG. 12 is an exploded view centering on a portion around the air vent hole 469.

With reference to FIGS. 11 and 12, the variable resonance space 460 of the electronic device 400 may be formed by combining the first resonance housing 461 and the second resonance housing 463, and sealing the combination using the first sealing member 467. When the resonance space 460 of the electronic device 400 is expanded, a negative pressure may be generated in the resonance space 460, and thus, expansion may not be easily performed due to resistance from the negative pressure. When the resonance space 460 is reduced, the pressure in the resonance space 460 may be increased, so that again, reduction may not be easily performed due to resistance from positive pressure. Furthermore, such a pressure change may damage the speaker 450. Hence, the air vent hole 469 may be defined as shown, to control the air pressure in connection with the space inside the electronic device 400 during reconfiguration.

Figure 13:
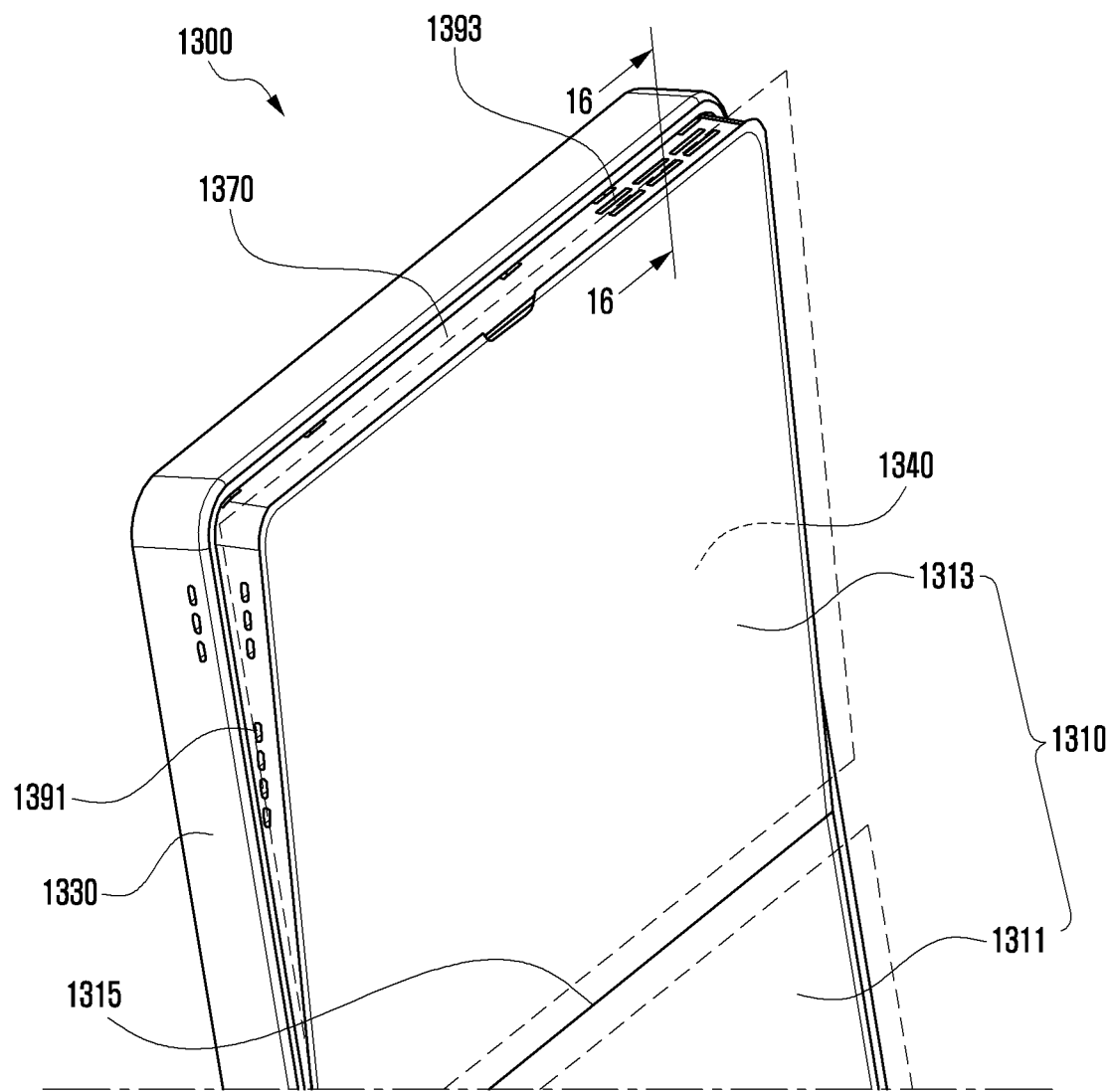
FIG. 13 is a view of an electronic device in the folded state according to another embodiment of the disclosure.

FIG. 13 shows the second region of an electronic device 1300 in the folded state according to another embodiment of the disclosure. FIG. 13 shows the upper portion of the electronic device 1300.

In another embodiment, the front plate 1310 of the electronic device 1300 may include a first region 1311 and a second region 1313. The first region 1311 may be located at one side of the axis 1315 about which the front plate 1310 is foldable. The second region 1313 may be located at the other side of the axis 1315 about which the front plate 1310 is foldable. As described previously, the first region 1311 may be a fixed region, and the second region 1313 may be separable by lifting from the side member 1330 when the front plate 1310 is folded. When the second region 1313 of the front plate 1310 is lifted, the inner housing 1370 may be lifted together. As the second region 1313 is lifted, the space between the rear plate 1320 and the front plate 1310 is expanded. This may be used as a space for diffusing heat of a heat generating source (e.g., antenna module). Circulation of air can be used to diffuse heat. For example, the air may flow into or flow out from the electronic device 1300 through ventilation holes 1391 and 1393 formed in the inner housing. The ventilation holes 1391 and 1393 may include an intake hole 1391 for intake of the air and an exhaust hole 1393 for discharging the air. One or more intake holes 1391 and/or exhaust holes 1393 may be arranged for the electronic device 1300. In another embodiment, the electronic device 1300 may further include a cooling fan (e.g., cooling fan 1390 in FIG. 14) to smoothly circulate the air.

Figure 14:
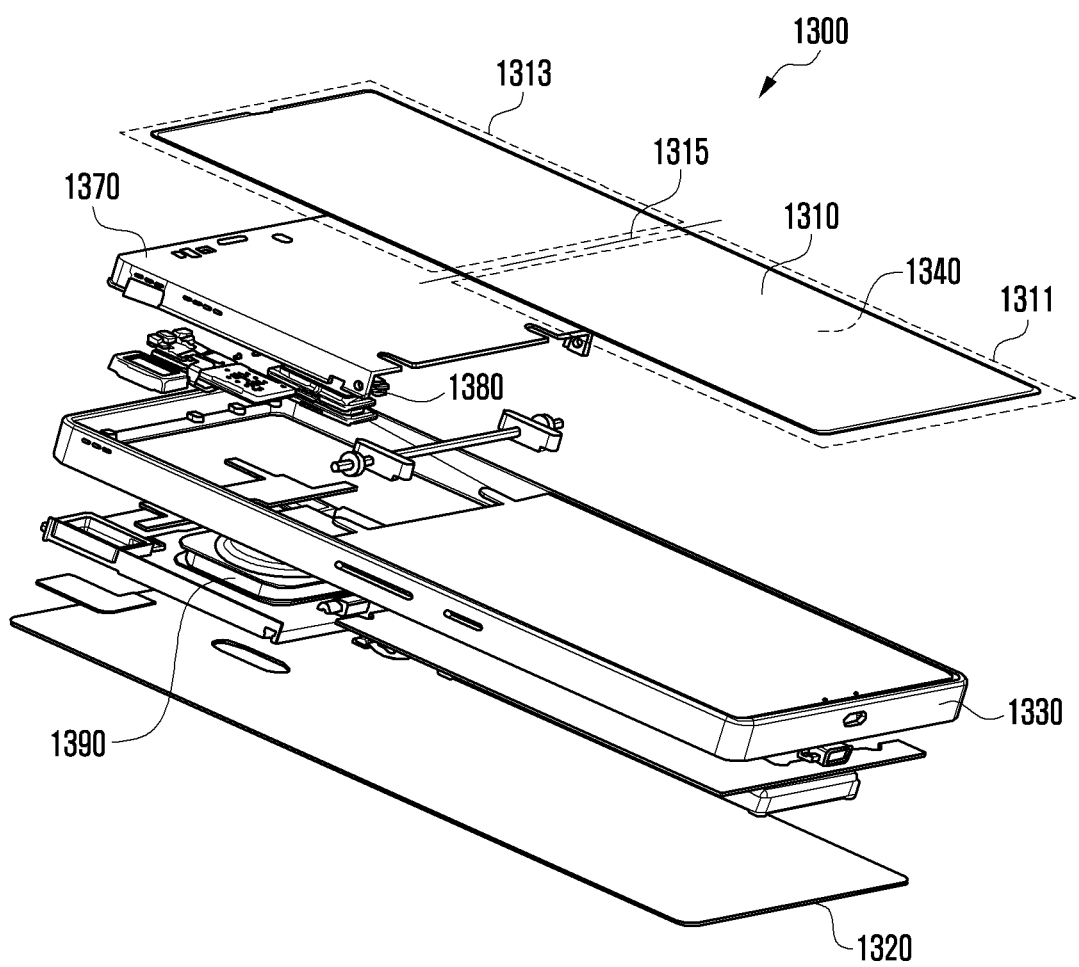
FIG. 14 is an exploded perspective view of an electronic device according to another embodiment of the disclosure.

FIG. 14 is an exploded perspective view of an electronic device according to another embodiment of the disclosure.

In another embodiment, the electronic device 1300 having a variable resonance space 1360 may include a front plate 1310, a rear plate 1320, a side member 1330, a display 1340, an inner housing 1370, an antenna module 1380, and a cooling fan 1390.

In the description on the electronic device 1300 according to another embodiment of the disclosure, the first direction may refer to an upward direction and the second direction may refer to a downward direction with reference to the illustration of FIG. 14.

In another embodiment, the front plate 1310, the rear plate 1320, the display 1340, and the side member 1330 may be the same as in FIG. 6.

In another embodiment, the inner housing 1370 may be formed corresponding to the second region 1313 of the front plate 1310 and may be moved along with the lifting of the second region 1313 due to the folding of the front plate 1310. The inner housing 1370 may provide a space in which various electronic components disposed inside the electronic device 1300 may be coupled. Electronic components that may be moved together in the process of lifting the second region 1313 may be disposed in the inner housing 1370. For example, a component such as the antenna module 1380 may be disposed in the inner housing 1370 and may be lifted together with the second region 1313. Ventilation holes (e.g., ventilation holes 1391 and 1393 in FIG. 15) may be formed in the inner housing 1370. The ventilation holes may include an intake hole 1391 and an exhaust hole 1393. The intake hole 1391 and the exhaust hole 1393 may be formed by penetrating the inner housing toward the side member so as to connect the outside of the electronic device 1300 and the internal space of the electronic device 1300. For example, the intake hole 1391 and the exhaust hole 1393 may be formed at a portion where the inner housing and the side member face each other. The exhaust hole 1393 may be formed close to the position of the antenna module 1380 and may be placed, for example, at the upper portion of the electronic device 1300. The intake hole 1391 may be formed at a portion where the exhaust hole 1393 is not present. For example, the intake hole 1391 may be formed at the inner housing in the width direction of the electronic device 1300. The air flow generated by intake of the air through the intake hole 1391 and discharging the air through the exhaust hole 1393 may be used to discharge the heat generated by the antenna module 1380 to the outside of the electronic device 1300.

In another embodiment, the antenna module 1380 may be disposed in the inner housing 1370 and may be lifted together with the second region 1313 of the front plate 1310. The antenna module 1380 may be disposed close to the exterior of the electronic device 1300 (e.g., near the side member 1330). A plurality of antenna modules 1380 may be arranged.

In another embodiment, the antenna module 1380 and the cooling fan 1390 may be located between the front plate 1310 and the rear plate 1320.

The antenna module 1380 may generate a large amount of heat during operation, and appropriate heat dissipation may secure operational reliability of the antenna module 1380. For example, the heat generated by the antenna module 1380 may be dissipated by an air cooling method in which the cooling fan 1390 is used to circulate the air. Here, when the space between the front plate 1310 and the rear plate 1320 is enlarged according to the folding of the front plate 1310, it is possible to circulate the air more smoothly, increasing the air cooling efficiency for the antenna module 1380.

Figure 15:
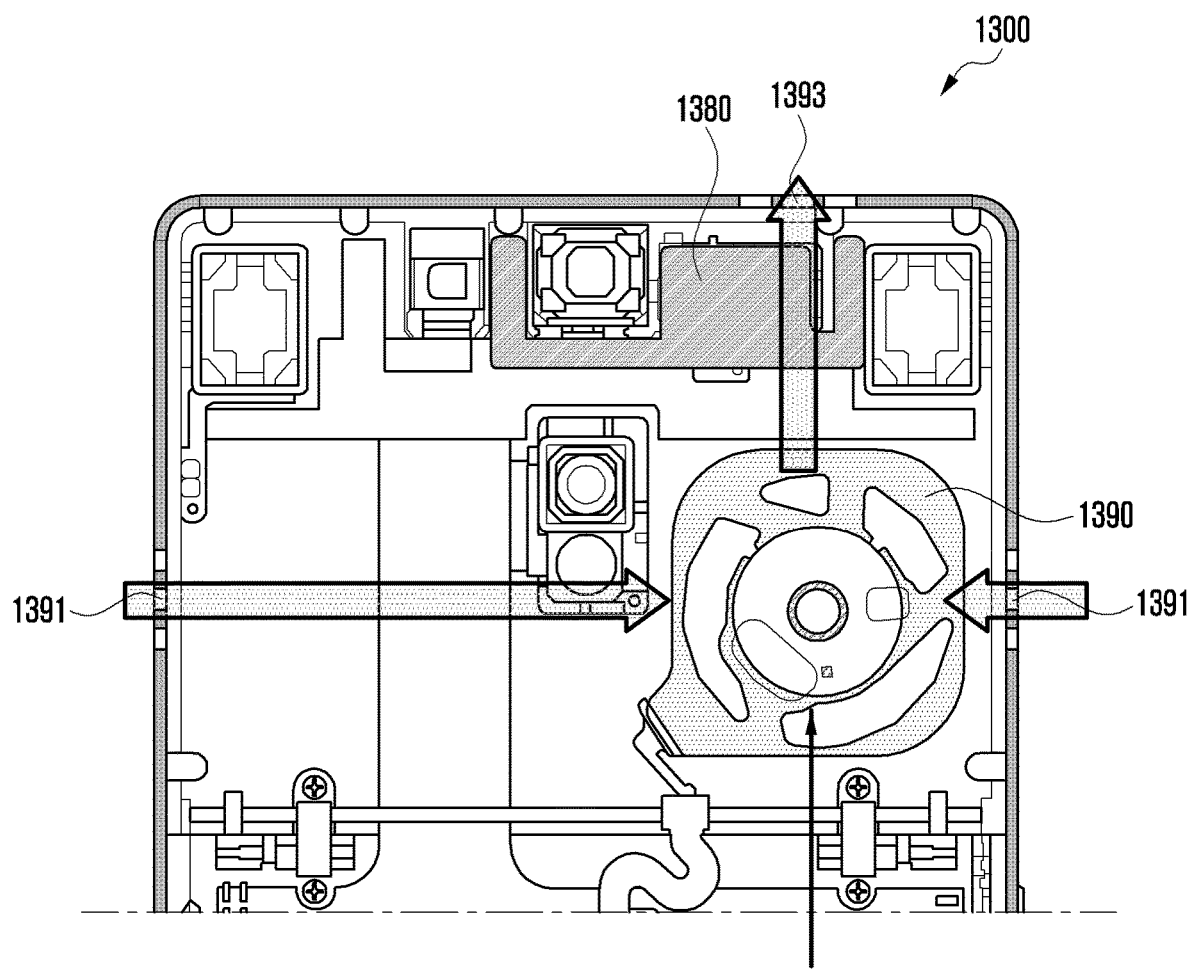
FIG. 15 is a view centering on a second region of the electronic device whose front plate is removed according to another embodiment of the disclosure.

FIG. 15 is a view centering on the second region (e.g., second region 1313 in FIG. 13) of the electronic device, whose front plate is removed according to another embodiment of the disclosure. FIG. 15 schematically shows the path of inflow and outflow of air as moved by the cooling fan.

In another embodiment, a cooling fan 1390 may be disposed between the front plate 1310 and the rear plate 1320 in the electronic device. The cooling fan 1390 may intake air through the intake hole 1391 and discharge air through the exhaust hole 1393, to dissipate the heat from the antenna module 1380 using air circulation. A plurality of exhaust holes 1393 and intake holes 1391 may be arranged. The exhaust hole 1393 may be disposed proximate to the antenna module 1380 to enable this functionality.

Figure 16:
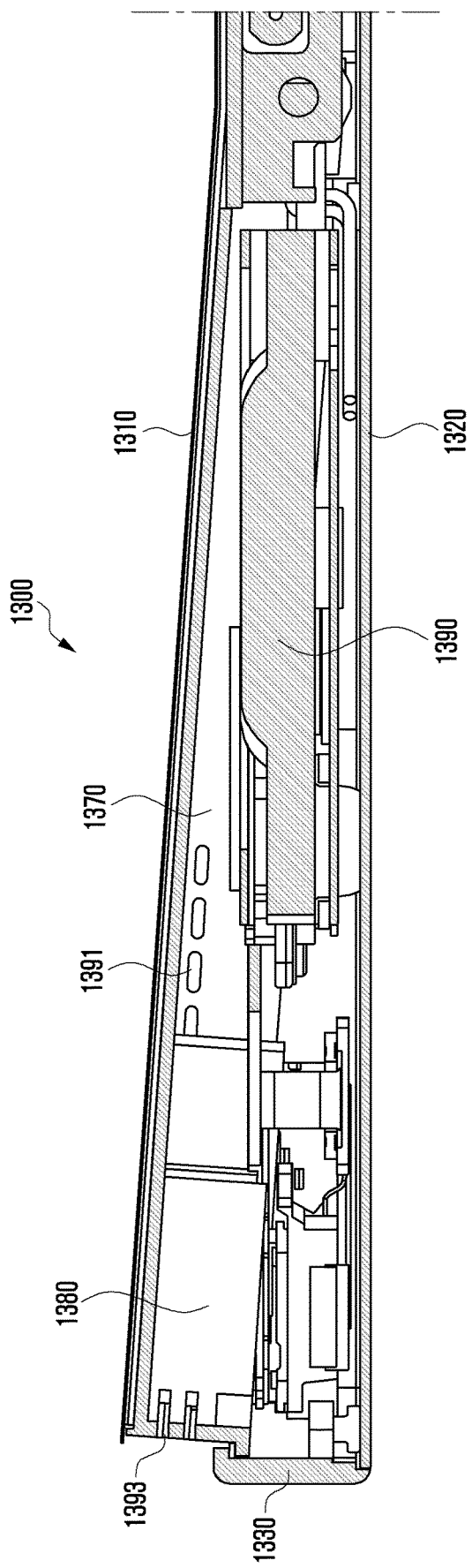
FIG. 16 is a cross-sectional view taken along the line 16-16 of FIG. 13.

FIG. 16 is a cross-sectional view taken along the line 16-16 of FIG. 13.

In the electronic device 1300, according to another embodiment, the space between the front plate 1310 and the rear plate 1320 may be expanded during the folding of the front plate 1310. The inner housing 1370 may be lifted according to the folding of the front plate 1310, and the intake hole 1391 and the exhaust hole 1393 may thus be exposed.

Through movement of some structures associated with the interior space defined in the electronic device, resonant qualities for the interior space may be improved by expansion, thereby improving sound quality.

To reduce the wear of the sealing member during reconfiguration of the resonance space, it is possible to maintain the sealing of the path through which the sound is transmitted.

Through movement of some structures associated with the interior space defined in the electronic device, resonant qualities for the interior space may be improved by expansion, thereby improving sound quality, it is possible to expand the interior space to improve heat dissipation efficiency by reconfiguration of the variable internal space.

According to an embodiment of the disclosure, the electronic device 400 may include: a housing including a front plate 410 facing in a first direction and being foldable, a rear plate 420 facing in a second direction opposite to the first direction, and a side member 430 surrounding the space between the front plate 410 and the rear plate 420; a display 440 having one surface viewed through the front plate 410 and being foldable along with the front plate 410; a speaker 450 positioned between the front plate 410 and the rear plate 420 and being moved with the folding of the front plate 410; and a resonance space 460 positioned between the speaker 450 and the rear plate 420 and being changed with the folding of the front plate 410.

The front plate 410 may include a first region 411 located on one side of the folding axis and being fixed, and a second region 413 located on the other side of the folding axis and being moved by folding.

The electronic device 400 may include an inner housing 470 that is formed corresponding to the second region 413, is located between the front plate 410 and the rear plate 420, is moved along with the folding of the front plate 410, and is coupled into the side member 430.

The resonance space 460 may be formed by combining a first resonance housing 461 located at the rear plate 420 and a second resonance housing 463 formed at the inner housing 470 and on which the speaker 450 is seated.

The electronic device 400 may include a first space 465 formed at a recessed portion of the bottom of the second resonance housing 463, and a first speaker hole 471 connected to the first space 465, formed in a direction of the side member 430, and penetrating the inner housing 470.

The electronic device 400 may further include a second speaker hole 431 formed to penetrate the side member 430 and be connected to the first speaker hole 471.

Inclined surfaces 433 and 473 may be formed on at least some of a region where the inner housing 470 and the side member 430 are in contact with each other.

The positions where the inclined surfaces 433 and 473 are formed may correspond to the positions where the first speaker hole 471 and the second speaker hole 431 are formed.

The electronic device 400 may further include a first sealing member 467 to seal the coupling portion between the first resonance housing 461 and the second resonance housing 463.

The electronic device 400 may further include a second sealing member 435 located on the inclined surface 433 between the inner housing 470 and the side member 430 and disposed around the second speaker hole 431.

The second sealing member 435 may be of a shape of a ring surrounding the second speaker hole 431.

The electronic device 400 may further include an air vent hole 469 connected to the first resonance housing 461 and connected to the inner space of the housing.

The electronic device 400 may further include a receiver, an illuminance sensor, a proximity sensor, a front camera module, and a rear camera module, and at least the rear camera module may be fixed directly or indirectly to the rear plate 420.

The electronic device 400 may further include an antenna module 1380 positioned between the front plate 410 and the rear plate 420 and being moved with the folding of the front plate 410, and a cooling fan 1390 positioned between the front plate 410 and the rear plate 420 and supplying air to the antenna module 1380.

The electronic device 400 may further include one or more ventilation holes 1391 and 1393 formed at the inner housing 470 toward the side member and exposed by the folding of the front plate 410.

The ventilation holes 1391 and 1393 may include an intake hole 1391 to intake air and an exhaust hole 1393 to discharge the air taken in through the intake hole 1391.

The exhaust hole 1393 may be disposed close to the antenna module 1380.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. An electronic device, comprising:
    a front plate facing a first direction and being foldable;
    a rear plate facing a second direction opposite the first direction, the rear plate including a first resonance housing;
    a side member surrounding a space defined between the front plate and the rear plate;
    an inner housing disposed to the front plate in the space between the front plate and the rear plate, moveable with the folding of the front plate, and insertable into the side member, the inner housing including a second resonance housing;
    a display having one surface visible through the front plate, and foldable with the front plate;
    a speaker disposed in the second resonance housing, the speaker movable with a folding of the front plate; and
    a resonance space defined between the first resonance housing located at the rear plate and the second resonance housing formed at the inner housing, a size of the resonance space changeable according to the folding of the front plate,
    wherein the resonance space expands when a part of the front plate is lifted outward from the side member and when a part of the inner housing is protruded outward from the side member.

2. The electronic device of claim 1, wherein the front plate comprises:
    a first region located to one side of a folding axis, the first region of the front plate being fixed; and
    a second region located to another side of the folding axis, the second region of the front plate moveable according to folding of the housing.

3. The electronic device of claim 2, wherein the inner housing corresponds to the second region.

4. The electronic device of claim 1, further comprising:
    a first space defined at least partially by recessed portion of a bottom of the second resonance housing; and
    a first speaker hole formed as to penetrate the inner housing, the first speaker hole communicatively connected to the first space and oriented towards the side member.

5. The electronic device of claim 4, further comprising a second speaker hole formed as to penetrate the side member, the second speaker hole communicatively connected to the first speaker hole.

6. The electronic device of claim 5, further comprising inclined surfaces forming at least a portion of a region where the inner housing and the side member contact with each other.

7. The electronic device of claim 6, wherein the inclined surfaces correspond to positions where the first speaker hole and the second speaker hole are defined.

8. The electronic device of claim 6, further comprising a second sealing member disposed on the inclined surface and formed between the inner housing and the side member, and disposed circumferentially surrounding the second speaker hole.

9. The electronic device of claim 8, wherein the second sealing member is formed as a ring surrounding the second speaker hole.

10. The electronic device of claim 1, further comprising a first sealing member disposed between the first resonance housing and the second resonance housing.

11. The electronic device of claim 1, wherein the housing further defines an air vent hole communicatively connected to the first resonance housing and an inner space of the housing.

12. The electronic device of claim 1, further comprising a receiver, an illuminance sensor, a proximity sensor, a front camera module, and a rear camera module, wherein at least the rear camera module is coupled to the rear plate.

13. The electronic device of claim 1, further comprising:
    an antenna module disposed between the front plate and the rear plate, the antenna module movable with the folding of the front plate; and
    a cooling fan disposed between the front plate and the rear plate, the cooling fan configured to push air towards the antenna module.

14. The electronic device of claim 13, further comprising one or more ventilation holes defines in the inner housing, oriented toward the side member and exposed to an exterior of the electronic device by the folding of the front plate.

15. The electronic device of claim 14, wherein the one or more ventilation holes include an intake hole to intake air, and an exhaust hole to discharge the air taken in through the intake hole.

16. The electronic device of claim 15, wherein the exhaust hole is defined in the housing such that air taken in through the intake hole contacts the antenna module before exiting the housing through the exhaust hole.

* * * * *